(12) United States Patent
Kim

(10) Patent No.: US 12,109,712 B1
(45) Date of Patent: Oct. 8, 2024

(54) SYSTEM FOR PROVIDING BEHAVIOR SIMULATION PLATFORM SERVICE

(71) Applicant: Pan Su Kim, Yongin-si (KR)

(72) Inventor: Pan Su Kim, Yongin-si (KR)

( * ) Notice: Subject to any disclaimer, the term of this patent is extended or adjusted under 35 U.S.C. 154(b) by 0 days.

(21) Appl. No.: 18/698,036

(22) PCT Filed: Sep. 20, 2022

(86) PCT No.: PCT/KR2022/014039
§ 371 (c)(1),
(2) Date: Apr. 3, 2024

(87) PCT Pub. No.: WO2023/106576
PCT Pub. Date: Jun. 15, 2023

(30) Foreign Application Priority Data

Dec. 10, 2021 (KR) .......................... 10-2021-0176947

(51) Int. Cl.
*B25J 9/16* (2006.01)
*B25J 9/00* (2006.01)

(52) U.S. Cl.
CPC .......... *B25J 9/1671* (2013.01); *B25J 9/0081* (2013.01)

(58) Field of Classification Search
CPC .................. B25J 9/0081; B25J 9/1671; G05B 2219/40395; G05B 2219/39244
See application file for complete search history.

(56) References Cited

U.S. PATENT DOCUMENTS

| 11,938,634 B2 * | 3/2024 | Gildert ................... B25J 9/1612 |
| 2016/0059412 A1 * | 3/2016 | Oleynik ................... B25J 19/02 700/250 |
| 2016/0059415 A1 * | 3/2016 | Guerin ................... B25J 9/1664 901/4 |
| 2018/0079076 A1 | 3/2018 | Toda |
| 2018/0178380 A1 | 6/2018 | Oestergaard et al. |
| 2021/0201692 A1 | 7/2021 | Hashimoto et al. |
| 2023/0031545 A1 * | 2/2023 | Oleynik ................. G05B 19/42 |

FOREIGN PATENT DOCUMENTS

| JP | 2018-043338 A | 3/2018 |
| JP | 2018-529140 A | 10/2018 |
| JP | 2020-026025 A | 2/2020 |
| KR | 10-1692602 B1 | 1/2017 |
| KR | 10-2017-0027918 A | 3/2017 |
| KR | 10-2017-0108526 A | 9/2017 |
| KR | 10-2254009 B1 | 5/2021 |

OTHER PUBLICATIONS

International Search Report for PCT/KR2022/014039 mailed Jan. 10, 2023 from Korean Intellectual Property Office.

* cited by examiner

*Primary Examiner* — Dale Moyer
(74) *Attorney, Agent, or Firm* — Revolution IP, PLLC

(57) ABSTRACT

A system for providing a behavior simulation platform service is provided, and comprises: a user terminal that selects and downloads at least one behavior simulation program, and then applies the at least one behavior simulation program to a previously owned robot; and a platform service provision server including a database unit that maps and stores the at least one behavior simulation program and at least one robot, a transmission unit that, if the user terminal selects a behavior simulation program, transmits the selected behavior simulation program to the user terminal, and a storage unit that, if feedback is received from the previously owned robot via the user terminal, stores the feedback.

2 Claims, 5 Drawing Sheets

(a)

(b)

(c)

SYSTEM FOR PROVIDING BEHAVIOR SIMULATION PLATFORM SERVICE

TECHNICAL FIELD

The present invention relates to a system for providing a behavior simulation platform service and provides a platform capable of outputting behavior data of a provider on a user's robot.

BACKGROUND ART

With the advent of the Fourth Industrial Revolution, there have been attempts to improve process efficiency and productivity across various manufacturing sectors, and as a core technology for this purpose, collaborative robots are garnering great attention. When there are technological limitations in fully automating a production line, workers may, in many cases, be deployed to the part of the production line and work together. In these cases, collaborative robots enable systematic tasks between humans and robots. In implementing a non-face-to-face society to cope with the recent pandemic, there has been an increasing demand for the application of robots to various industrial fields in which direct contact between people was required, such as the fields of logistics, food manufacturing, delivery, serving, and medicine. Implementing human-human interaction into human-robot interaction is required for realizing a non-face-to-face society, and from this perspective, collaborative robot technology is considered a key technology.

In this case, a robot equipped with a program for simulating actions of a human and combining behaviors or frying chicken has been researched and developed. As the related arts, there are disclosed Korean Patent Publication No. 10-2017-0108526 (published on Sep. 27, 2017), and Korean Patent Registration No. 10-2254009 (announced on May 20, 2021), which disclose a configuration in which, in order to generate a task behavior trajectory of a robot, a simulation trajectory of a task behavior of a human is obtained and is divided into at least one behavior unit, the divided behavior units are grouped and classified, a probability model trained on each behavior unit is stored in a database, a representative trajectory for the behavior unit is generated, and then the simulation trajectory is reconstructed; and a configuration in which, in order to automatically fry chicken, a robot arm recognizes the location of each container and moves chicken ingredients to the cooking container according to each operation to proceed with the chicken cooking process.

However, in the former and latter cases, a single robot is embedded with a one-purpose program in one-to-one correspondence, and therefore in order to use a different program, there has been the inconvenience of needing to change hardware or the robot itself or to start programming from scratch. Accordingly, there is a need for research and development of a platform capable of building a platform that enables unidirectional or bidirectional exchange of behavior simulation programs and allowing a desired behavior simulation program to be selected and downloaded such that various functions are implemented with a single robot.

DISCLOSURE

Technical Problem

The present invention is directed to a system for providing a behavior simulation platform service that is capable of building a platform that enables unidirectional, bidirectional, or collaborative exchange of behavior simulation programs, and allowing a desired behavior simulation program to be selected and downloaded for a single robot to implement various functions. However, the technical problems to be achieved by the present embodiment are not limited to the above-described technical problems, and other technical problems may exist.

Technical Problem

One aspect of the present invention includes: a user terminal that selects and downloads at least one behavior simulation program and applies the at least one behavior simulation program to a previously owned robot; and a platform service providing server including a database unit which maps and stores the at least one behavior simulation program and at least one robot, a transmission unit that, in response to a behavior simulation program being selected by the user terminal, transmits the selected behavior simulation program to the user terminal, and a storage unit that, in response to feedback being received from the previously owned robot via the user terminal, stores the feedback.

Advantageous Effects

According to any one of the means for solving the problems of the present invention described above, a platform that enables unidirectional, bidirectional, or collaborative exchange of behavior simulation programs is built, and a desired behavior simulation program is selected and downloaded so that a single robot can implement various functions.

MODES OF THE INVENTION

Figure 1:
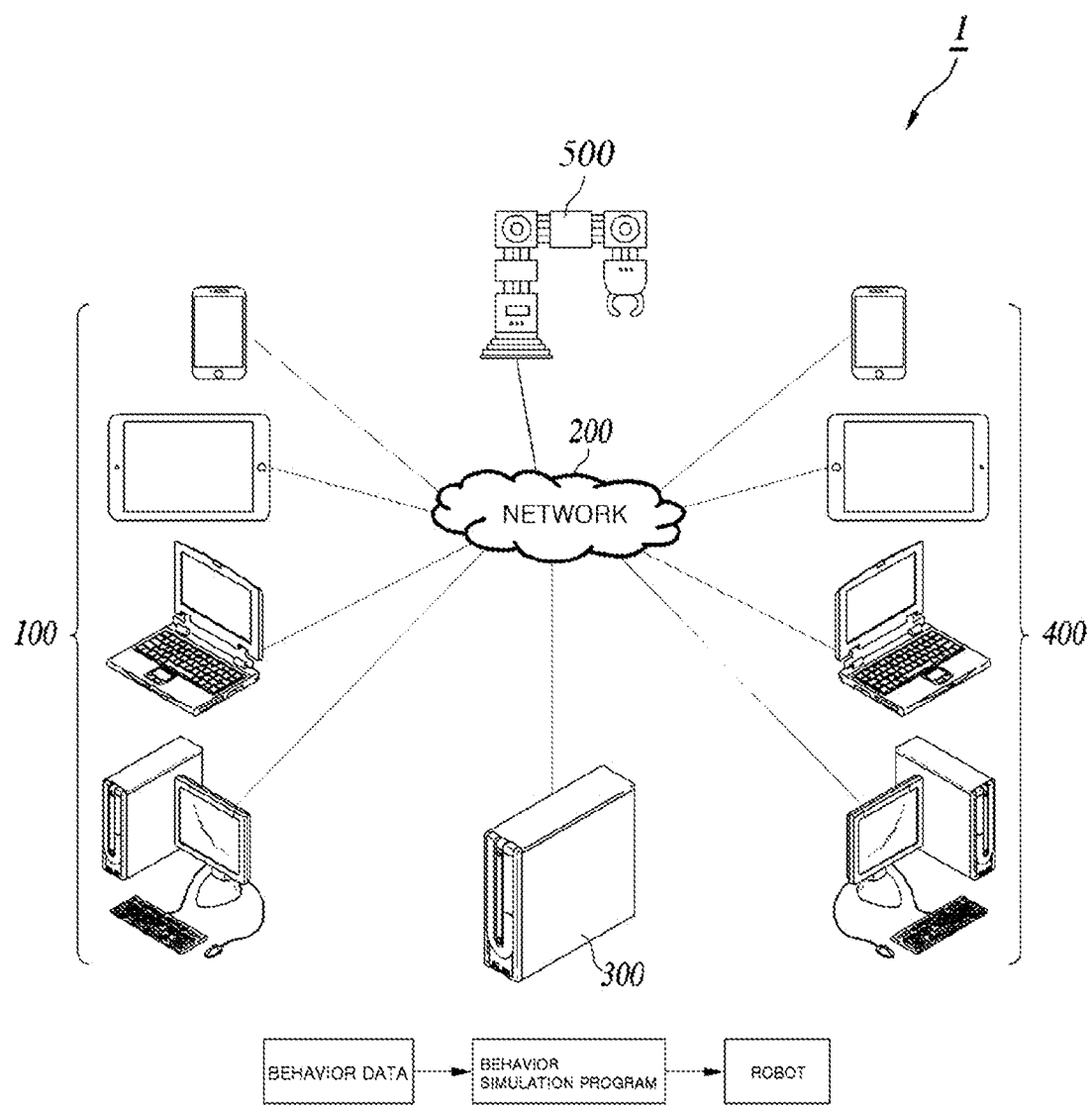
FIG. 1 is a diagram for describing a system for providing a behavior simulation platform service according to an embodiment of the present invention.

Hereinafter, embodiments of the present invention will be described in detail with reference to the accompanying drawings so that those of ordinary skill in the art can easily implement the present invention. However, the present invention may be implemented in various different forms and is not limited to the embodiments described herein. In the drawings, parts irrelevant to the description are omitted in order to clearly describe the present invention, and similar reference numerals are attached to similar parts throughout the specification.

Throughout the specification, when a part is said to be "connected" to another part, this includes not only "directly connected" but also "electrically connected" with another element interposed therebetween. In addition, when a part "includes" a certain component, it does not mean that other components are excluded and other components or one or more other features may be further included unless specifically stated to the contrary. The presence or addition of any number, step, action, component, part, or combination thereof is not precluded.

The terms "about," "substantially," and the like, as used throughout the specification, are used to refer to ranges in or close to the stated numerical values when manufacturing and material tolerances specific to the stated meaning are presented, and are used to provide an understanding of the present invention. Accurate or absolute numerical values are used to prevent unreasonable use of the stated disclosure by unscrupulous infringers. As used throughout the specification of the present invention, the term "step" or "step of" does not mean "step for."

In the present specification, "unit" includes a unit realized by hardware, a unit realized by software, and a unit realized using both. Further, one unit may be realized by using two or more pieces of hardware, or two or more units may be realized by one piece of hardware. It should, however, be understood that the term "unit" is not limited to a software or hardware element. A "unit" may be implemented in addressable storage media. A "unit" may also be configured to reproduce one or more processors. For example, a "unit" may include various types of elements (e.g., software elements, object-oriented software elements, class elements, task elements, etc.), segments (e.g., processes, functions, attributes, procedures, sub-routines, program code, etc.), drivers, firmware, micro-code, circuits, data, databases, data structures, tables, arrays, variables, etc. Functions provided by elements and "units" may be formed by combining them into a smaller number of elements and "units" or may be divided into additional elements and "units." In addition, elements and "units" may also be implemented to reproduce one or more CPUs in devices or security multi-cards.

In the present specification, some of the operations or functions described as being performed by the terminal, apparatus, or device may be performed instead in a server connected to the terminal, apparatus, or device. Likewise, some of the operations or functions described as being performed by the server may also be performed by a terminal, apparatus, or device connected to the server.

In this specification, some of the operations or functions described as mapping or matching with the terminal are mapped or matched with the unique number of the terminal or the identification information of the individual, which is the identification information (identifying data) of the terminal.

Hereinafter, the present invention will be described in detail with reference to the accompanying drawings.

FIG. 1 is a diagram for describing a system for providing a behavior simulation platform service according to an embodiment of the present invention. Referring to FIG. 1, a system 1 for providing a behavior simulation platform service may include at least one user terminal 100, a platform service providing server 300, at least one provider terminal 400, and at least one robot 500. However, since the system 1 for providing a behavior simulation platform service shown in FIG. 1 is only an embodiment of the present invention, the interpretation of the present invention is not restricted to FIG. 1.

In this case, components in FIG. 1 may be generally connected via a network 200. For example, as shown in FIG. 1, the at least one user terminal 100 may be connected to the platform service providing server 300 via the network 200. In addition, the platform service providing server 300 may be connected to the at least one user terminal 100, the at least one provider terminal 400, and the at least one robot 500 via the network 200. Additionally, the at least one provider terminal 400 may be connected to the platform service providing server 300 via the network 200. Additionally, the at least one robot 500 may be connected to the at least one user terminal 100, the platform service providing server 300, and the at least one provider terminal 400 via the network 200.

Here, the network is a connection structure in which information exchange is performed between nodes such as a plurality of terminals and servers, and examples of the network include a local area network (LAN), a wide area network (WAN), the Internet (World Wide Web (WWW)), wired and wireless data communication networks, telephone networks, and wired and wireless television communication networks. Examples of the wireless data communication networks include 3G, 4G, 5G, $3^{rd}$ Generation Partnership Project (3GPP), 5th Generation Partnership Project (5GPP), Long Term Evolution (LTE), World Interoperability for Microwave Access (WiMAX), Wi-Fi, the Internet, a LAN, a wireless LAN, a WAN, a personal area network (PAN), a radio frequency (RF), a Bluetooth network, a near-field communication (NFC) network, a satellite broadcasting network, an analog broadcasting network, a Digital Multimedia Broadcasting (DMB) network, and the like, but the network according to the present invention is not limited thereto.

In the following, the term "at least one" is defined as including a singular form and a plural form, and even without the term "at least one," each component may be present in a singular or plural form, and refer to a singular or plural form. Additionally, whether each component is provided in a singular or plural form may vary depending on the embodiment.

The at least one user terminal 100 may be a terminal of a user that, using a web page, app page, program, or application related to a behavior simulation platform service, receives behavior data and delivers the received behavior data to the robot 500, or receives a behavior simulation program and delivers the received behavior simulation program to the robot 500, or delivers behavior data to the platform service providing server 300. In this case, the behavior data is a modular unit module, and the behavior simulation program is defined as including all processes for performing a series of targets. For example, when behavior data is a unit module, such as [A], [B], and [C], a behavior simulation program is defined as including a series of processes such as [A-B-C]. In addition, in a platform according to the present invention, users may select a unidirectional mode, a bidirectional mode, or a collaborative mode. The unidirectional mode involves a process of downloading and executing behavior data, similar to purchasing an application from the Apple Store or Google Play, the bidirectional mode involves tracking behavior data and delivering the behavior data in real time to robots of each party, that is, the user terminal 100 and the provider terminal 400, similar to delivering voices of both parties in a phone call, and the collaborative mode is defined as a mode in which behavior data from the user terminal 100 and data from the provider terminal 400 are combined and input to one robot 500.

Here, the at least one user terminal 100 may be implemented as a computer capable of accessing a remote server or terminal through a network. Here, the computer may include, for example, a navigation system, a laptop computer, a desktop computer, etc. equipped with a web browser. In this case, the at least one user terminal 100 may be implemented as a terminal capable of accessing a remote server or terminal through a network. The at least one user terminal 100 may be, for example, a wireless communication device that ensures portability and mobility, and may be any type of handheld-based wireless communication device, such as a navigation terminal, a personal communication system (PCS) terminal, a global system for mobile communication (GSM) terminal, a personal digital cellular (PDC) terminal, a personal handyphone system (PHS) terminal, a personal digital assistant (PDA) terminal, an international mobile telecommunication (IMT)-2000 terminal, a code division multiple access (CDMA)-2000 terminal, a W-CDMA terminal, a wireless broadband (WiBro) terminal, a smartphone, a smartpad, or a tablet PC.

The platform service providing server 300 may be a server that provides a web page, app page, program, or application related to a behavior simulation platform service. Additionally, the platform service providing server 300 may be a server that receives behavior data or a behavior simulation program from the provider terminal 400 and modulates or stores the behavior data or behavior simulation program. Additionally, the platform service providing server 300 may be a server capable of generating a channel for providing a bidirectional mode between the user terminal 100 and the provider terminal 400 or for providing a collaborative mode. Additionally, the platform service providing server 300 may be a server that, in response to feedback being received from the robot 500 of the user terminal 100 that is error feedback, transmits the feedback to the provider terminal 400 that has generated or produced the feedback, to request that the error or bug be corrected.

Here, the platform service providing server 300 may be implemented as a computer capable of accessing a remote server or terminal through a network. Here, the computer may include, for example, a navigation system, a laptop computer, a desktop computer, etc. equipped with a web browser.

The at least one provider terminal 400 may be a terminal of a provider that, using a web page, app page, program, or application related to a behavior simulation platform service, uploads behavior data or a behavior simulation program to provide the behavior data or the behavior simulation program. In this case, the provider terminal 400 may be a terminal that may be connected to the user terminal 100 in a bidirectional mode or a collaborative mode. In order to upload behavior data, the provider terminal 400 may be a terminal that is linked to at least one type of sensor or equipment capable of tracking human behaviors. In this case, the provider terminal 400 may be a specially manufactured terminal having a function for generating behavior data, for example, with a 3D scanner, or a function for scanning electrical muscle signals or electrical joint signals.

Here, the at least one provider terminal 400 may be implemented as a computer capable of accessing a remote server or terminal through a network. Here, the computer may include, for example, a navigation system, a laptop computer, a desktop computer, etc. equipped with a web browser. In this case, the at least one provider terminal 400 may be implemented as a terminal capable of accessing a remote server or terminal through a network. The at least one provider terminal 400 may be, for example, a wireless communication device that ensures portability and mobility, and may be any type of handheld-based wireless communication device, such as a navigation terminal, a PCS terminal, a GSM terminal, a PDC terminal, a PHS terminal, a PDA terminal, an IMT-2000 terminal, a CDMA-2000 terminal, a W-CDMA terminal, a WiBro terminal, a smartphone, a smartpad, or a tablet PC.

The at least one robot 500 may be a device that, with or without using a web page, app page, program, or application related to a behavior simulation platform service, receives behavior data or a behavior simulation program and is controlled to respond to the behavior data or behavior simulation program. In this case, when the user terminal 100 is omitted, the robot 500 may include a function to be directly connected to the network 200, and track a behavior of a user or a provider, generate behavior data, and then upload the behavior data. In this case, since the configuration of the user terminal 100 may be deleted, the configuration of the user terminal 100 may not be an essential element.

Here, the at least one robot 500 may be implemented as a computer capable of accessing a remote server or terminal through a network. Here, the computer may include, for example, a navigation system, a laptop computer, a desktop computer, etc. equipped with a web browser. In this case, the at least one robot 500 may be implemented as a terminal capable of accessing a remote server or terminal through a network. The at least one robot 500 may be, for example, a wireless communication device that ensures portability and mobility, and may be any type of handheld-based wireless communication device, such as a navigation terminal, a PCS terminal, a GSM terminal, a PDC terminal, a PHS terminal, a PDA terminal, an IMT-2000 terminal, a CDMA-2000 terminal, a W-CDMA terminal, a WiBro terminal, a smartphone, a smartpad, or a tablet PC.

Figure 2:
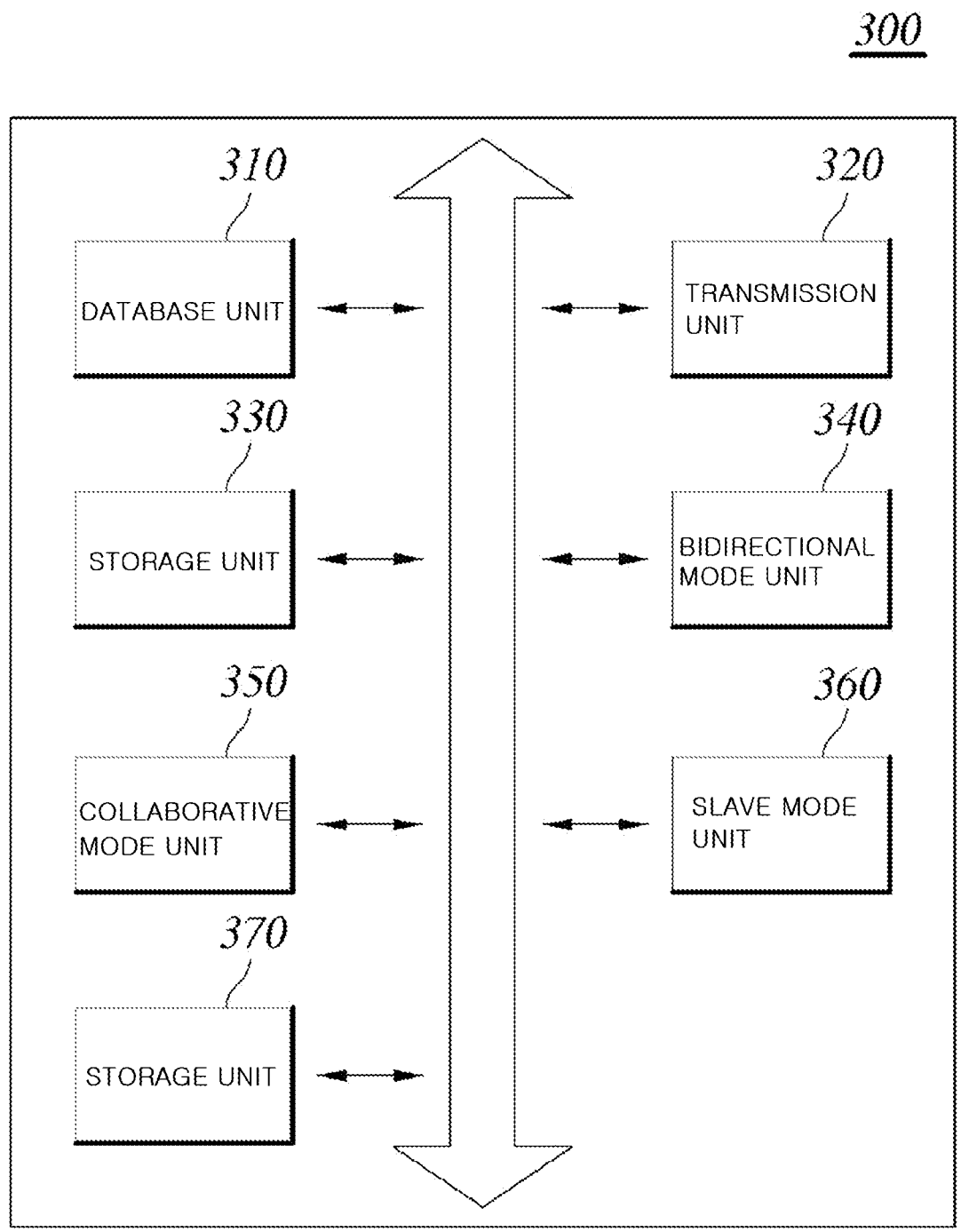
FIG. 2 is a block diagram illustrating a platform service providing server included in the system shown in FIG. 1.
Figure 3:
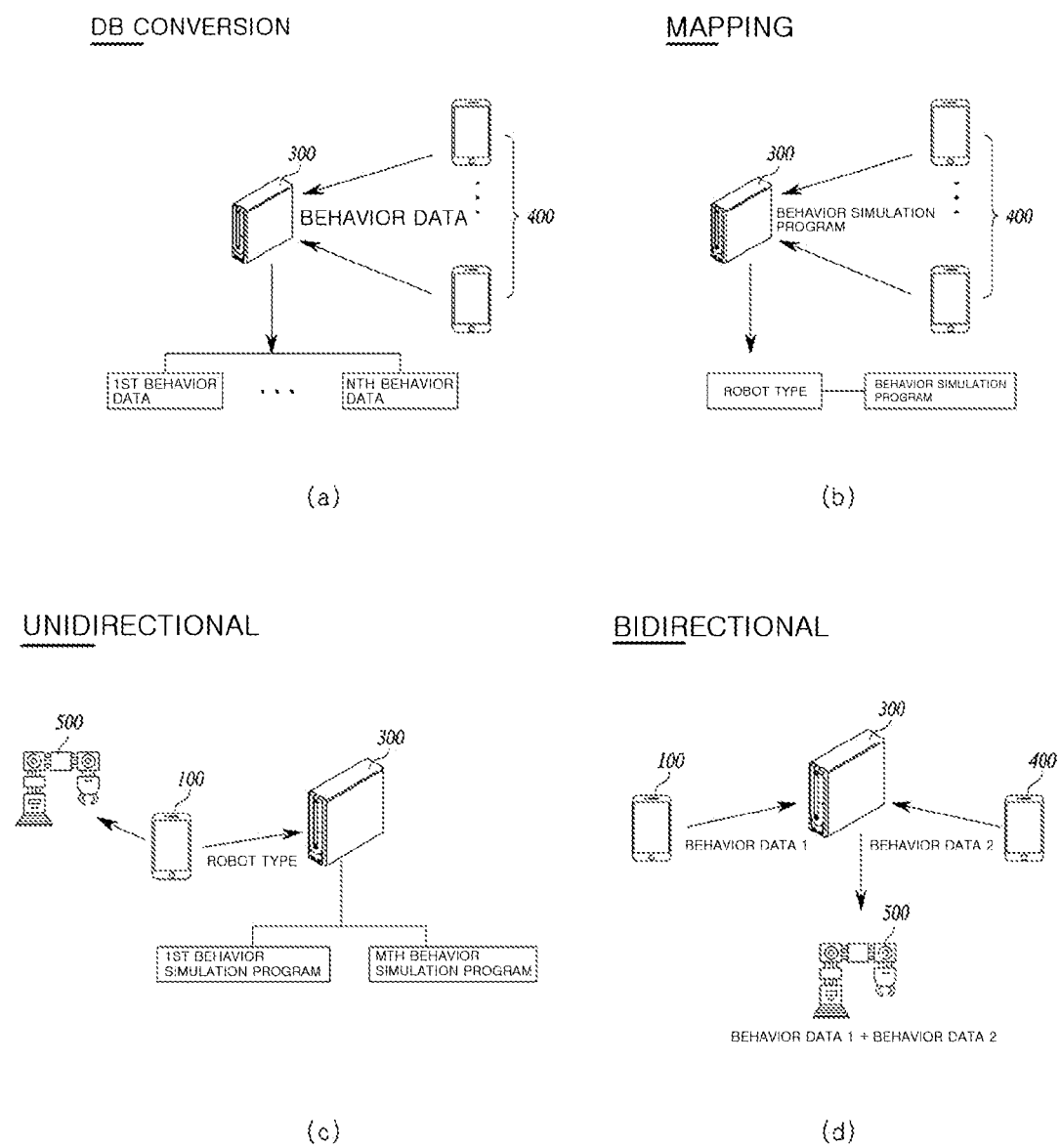
FIGS. 3 and 4 are diagrams for describing an embodiment in which a behavior simulation platform service according to an embodiment of the present invention is implemented.
Figure 4:
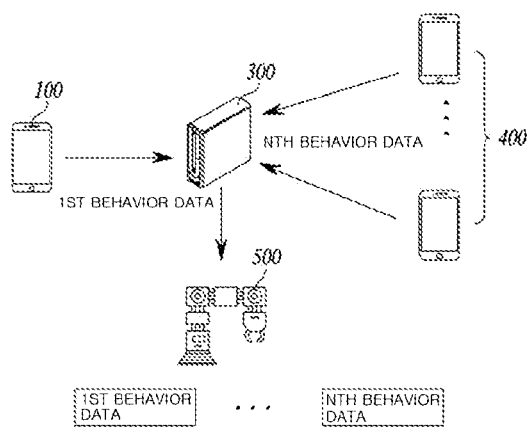
Figure 4:
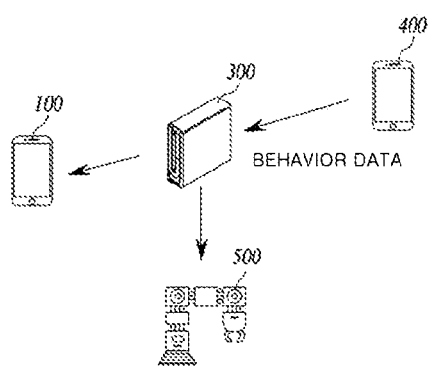
Figure 4:
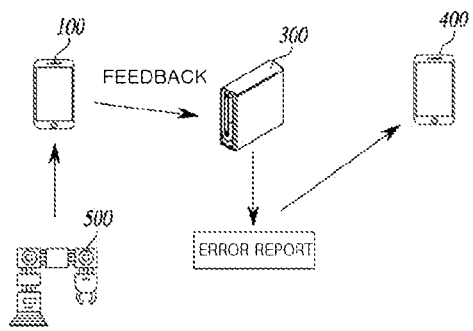

FIG. 2 is a block diagram illustrating a platform service providing server included in the system shown in FIG. 1, and FIGS. 3 and 4 are diagrams for describing an embodiment in which a behavior simulation platform service according to an embodiment of the present invention is implemented.

Referring to FIG. 2, the platform service providing server 300 may include a database unit 310, a transmission unit 320, a storage unit 330, a bidirectional mode unit 340, a collaborative mode unit 350, a slave mode unit 360, and a storage unit 370.

When the platform service providing server 300 according to the embodiment of the present invention or another server (not shown) operating in conjunction with the platform service providing server 300 transmits an application, program, app page, web page, etc. related to a behavior simulation platform service to at least one user terminal 100, at least one provider terminal 400, and at least one robot 500, the at least one user terminal 100, the at least one provider terminal 400, and the at least one robot 500 may install or open the application, program, app page, web page, etc. related to a behavior simulation platform service. Additionally, the service program may be run on the at least one user terminal 100, the at least one provider terminal 400, and the at least one robot 500 using a script executed in a web browser. Here, a web browser is a program that enables the use of web (WWW) services and is a program that receives hypertext written in hypertext mark-up language (HTML) and displays content. For example, the web browser may be Netscape, Explorer, Chrome, etc. Additionally, an application is an application program on a terminal and examples of the application include an app running on a mobile terminal (a smartphone).

Referring to FIG. 2, the database unit 310 may store at least one behavior simulation program to be mapped to at least one robot 500. At least one behavior simulation program has a flow that simulates a series of behaviors of a provider with or without any target, as described above. In order to simulate a provider's behavior, a method of accurately recognizing a motion mode by forming a skeletal image for motion recognition and reconstructing the skeleton image into an image connecting joints of each body part may be used instead of a method of detecting a movement. Additionally, a method of compensating for errors in distance measurement data may be used to minimize an error between an actual distance and a measured distance such that a robot may operate effectively. Accordingly, a producer's behavior may be recognized and simulated.

<Robot System>

The overall system structure of a robot may include Xtion Pro Live, which is a 3D distance measurement camera, an embedded board serving as a personal computer (PC), a voice module in charge of voice recognition, and a microprocessor (DSP-28335) that receives data and controls motors. Since Xtion Pro Live is a 3D distance measurement camera connected via USB 2.0, the role of a PC performing actual image processing may be handled by the embedded board, PCM-3363. The processed data may be transmitted to DSP-28335 through RS-232 serial communication. Through the transmitted data, the motors located at each joint of the robot 500 are controlled such that a motion of the robot 500 may be performed. The voice module used may recognize N types of voices, and according to each voice, motions may be controlled, and the resulting data may be transmitted to the microprocessor.

The flow of operations of a robot include, upon execution of the robot 500, receiving various types of data from Xtion Pro Live or the voice module. In order to receive behavior data, the robot 500 may receive joint data from the Xtion Pro Live, through which the robot 500 may execute operation modes divided into a tracking mode of following a provider, a motion mirroring mode of mimicking a provider's motion, and a stop mode of stopping all motions according to a motion taken by the provider. In addition, the voice module may remember N types of voices, and when the memorized voice is executed, a motion corresponding to the voice may be executed.

A system environment for the robot 500 to recognize a motion and process the recognized motion may involve inputting and outputting images through OpenCV, and recognizing humans and measuring depth distances through OpenNI. Additionally, motion recognition may be completed through NITE. A structure constituting Xtion Pro Live is programmed using a basic OpenNI library. The OpenNI library, as a container for containing resolution, metadata, and the like, may contain basic information, and may enable provider detection and distance measurement that are used by the robot 500. NITE is an OpenNI middleware library that supports motion recognition. Here, functions for extracting skeleton data of each joint may be provided.

<Image Processing Algorithm>

In a process of recognizing and mimicking a provider's motion, an image processing process including generating a distance map (a depth map) to output a distance image, and recognizing a motion using NITE may be performed. The generating of a depth map, which is the first operation in the image processing process, requires generating context of OpenNI, which is the basic structure that constitutes Xtion Pro Live. In order to obtain distance information from the generated context, DepthGenerator may be called. Depth information called from DepthGenerator may be transmitted to the OpenNI context to generate a depth map. Additionally, an output map mode may be set in the generated distance map. By specifying a resolution of 480 pixels vertically and 640 pixels horizontally, and setting a video graphics array (VGA) mode of 30 frames per second (FPS), the set map information may be applied to the context, and map generation may begin. A map is generated, and then a window may be generated using an image input/output function by Highgui.h, which is an OpenCV input/output header file. RGB values of each pixel in the generated window may be set, and information of the context may be applied to the window and output, thus generating the depth map. In the generated map, motion recognition is not possible, but measurement of a distance value (depth) in an area from 0.8 m to 3.5 m, which is a measurable range of Xtion Pro Live, is possible.

In order to use motion recognition, which is the second process in the image processing, NITE, an OpenNI middleware library, may be used. An XML file containing motion recognition functions in NITE may be used to extract information of NITE. In UserGenerator, which is a function that generates nodes and supports motion recognition in a generated file, PoseDetection, which recognizes humans, and Skeleton, which recognizes human joints, may be declared. Events of UserDetection, Calibration, and PoseDetection may be identified using a Callback function in each of the declared functions. Thereafter, corresponding joint data of a user may be extracted using GetSkeletonJointPosition, which is a function that extracts joint data of a human. The extracted data represents data of a total of 24 joints of a human, with X and Y expressed as pixel coordinates and Z as a distance. For example, on the generated depth map, skeletal joints representing human joints may be drawn as lines using OpenCV. Additionally, a rotation (orientation), which represents the orientation of a joint, may be expressed as a quaternion.

<Operation Mode>

Three operation modes using images may be used for the robot 500. The first mode is a tracking mode of obtaining a distance value of a torso joint and using the distance value. The second mode is a mirroring mode of calculating the angles of the upper and lower arms and the torso at each joint using the inner product of vectors to obtain angle values, and identifying the position of the provider to adjust gaze for eye contact, and the last mode is a stop mode. The obtaining of the distance of the torso joint for the tracking mode may be achieved using the UserGenerator function of OpenNI. By setting a user variable, a joint name, and a joint variable in the function, the distance value in millimeters (mm) may be obtained.

In the motion mirroring mode, the angles set to mimic a motion of a human may be a total of five angles including the right upper arm, the right lower arm, the left upper arm, the left lower arm, and the torso, but are not limited thereto. Each angle may use the inner product of vectors.

$$\theta = \cos^{-1}\left(\frac{\vec{A}\cdot\vec{B}}{|\vec{A}||\vec{B}|}\right) \quad \text{[Equation 1]}$$

Equation 1 is an equation that represents the angle between two vectors from the inner product of the vectors. When calculating Equation 1, taking the left upper arm as an example, vector A is a vector connecting the neck joint and the left shoulder joint, and vector B is a vector connecting the left shoulder joint and the left arm joint. By obtaining the angle between the two vectors, the angle value of the joints may be obtained. This may be expressed in source code, and a total of N joint angles may be obtained. The joint angle values obtained here may be transmitted to a digital signal processor (DSP), and based on the transmitted angle value, the robot 500 may proceed with a motion that mimics the appearance of the provider.

In motion mirroring, data obtained based on a human neck joint for eye contact includes a distance and X and Y values of a two-dimensional plane. To obtain the values of X and Y, pixel coordinates and distance information may need to be used. For example, Xtion Pro Live has a field of view (FOV) of 45° (a vertical viewing angle) and 58° (a horizontal viewing angle) and a focal length of 1.083 mm. By applying the values to Equation 2 and Equation 3, actual values of X and Y may be obtained.

$$Z = (D+F)\tan\left(\frac{45°}{2}\right)\left(\frac{X_i - 320}{640}\right) \quad \text{[Equation 2]}$$

$$Y = (D+F)\tan\left(\frac{58°}{2}\right)\left(\frac{240 - Y_i}{480}\right) \quad \text{[Equation 3]}$$

Here, D is a distance, F is a focal length, and $X_i$ and $Y_i$ are pixel coordinate values in the horizontal and vertical directions. Since X and Y obtained as pixel coordinates may have the same pixel information even with different distances, many errors occur in visual contact. Information for determining the actual position of a human based on a distance using actual X and Y values may be calculated using depth and a tangent value between the actual X and Y. The obtained value may be transmitted to the DSP and the robot 500 may be controlled.

Operations in each of the three modes are generated and selected by a user. When operated, the robot 500 recognizes a provider, and upon completion of a calibration process, selects a mode through a mode selection operation, and then performs an operation of the selected mode. A process of generating the operations may be achieved through angles and vertical pixel coordinates of specific joints. Conditions for generating each operation are as follows. Conditions for a tracking mode may be set based on selection of a range of joint angles and joint vertical pixel coordinates. The joint angle range is set such that the angle of the left lower arm is between 75° and 105° and the angle of the right lower arm is between 75° and 105°, and the joint vertical pixel coordinates are set such that the vertical coordinate of the left hand is greater than the vertical coordinate of the left shoulder, and the vertical coordinate of the right hand is smaller than the vertical coordinate of the right shoulder. Operations are generated as described above simply based on the joint angles and the vertical pixel coordinates, and the remaining operations may also be generated in the same process as described above.

<Depth Error Correction>

The tracking and the motion mirroring used in the robot 500 operate based on the distance measured in the Xtion Pro Live. Therefore, determining whether the distance is a reliable value is the most important issue. A method of measuring the distance uses a principle that a specific pattern of infrared light is transmitted from the Xtion Pro Live and the infrared light reflected by an object is detected by the camera. How many pixels the specific pattern has moved is measured and converted to a distance, whereby the distance is measured. For example, infrared light has a specific pattern, and a change of 1 cm in distance as a result of measurement corresponds to a movement of 1 pixel, which indicates that the minimum resolution is 1 cm. Accordingly, errors may be analyzed through an experiment that directly measures the distance.

When data is arranged without any regularity, the data needs to be handled by correcting errors in measured distance. In this case, polynomial interpolation may be used. The polynomial interpolation may be provided as a numerical method in a manner of approximation with a function of a higher-degree polynomial. Corrected data using the finally corrected error value may be determined to be reliable and may be converted into code and applied.

The transmission unit 320 may, in response to a behavior simulation program being selected by the user terminal 100, transmit the selected behavior simulation program to the user terminal 100. The user terminal 100 may select at least one behavior simulation program, download the at least one behavior simulation program, and apply the at least one behavior simulation program to the previously owned robot 500. The previously owned robot 500 may be at least one of a wearable robot 500 worn by the user, a robot 500 arm with an arm, a robot 500 with a wheel, a crawler robot 500, and a robot 500 leg with a leg, but is not limited to those listed and nothing is excluded just because it is not listed.

The storage unit 330 may, in response to feedback being received from the previously owned robot 500 via the user terminal 100, store the feedback. In this case, the feedback may not only report errors but also report the current status of the robot 500 for proportional-integral-derivative (PID) control. The storage unit 330 may receive behavior data from at least one provider terminal 400 and store the received behavior data. In this case, the behavior data may be data generated through a 3D scanner or electrical muscle signals, but an apparatus or method for tracking a provider's behavior is not limited to the above.

The bidirectional mode unit 340 may transmit behavior data received from the user terminal 100 and the at least one provider terminal 400 in two directions toward the at least one provider terminal 400 and the user terminal 100. In this case, tracking equipment that tracks a user's behavior, for example, image-based or sensor-based equipment, and a robot 500(1) that outputs a provider's behavior data are needed. Similarly, tracking equipment that tracks a provider's behavior and a robot 500(2) that outputs a user's behavior data are needed. In this case, in order for the user's behavior data to be output on the provider's robot 500(2), a connection may be established as [the tracking equipment—the user terminal 100—the bidirectional mode unit 340—the provider terminal 400—the robot 500(2)]. Conversely, in order for the provider's behavior data to be output on the user's robot 500(1), a connection may be established as [the robot 500(1)—the user terminal 100—the bidirectional mode unit 340—the provider terminal 400—the tracking equipment]. Each of the user terminal 100 and the provider terminal 400 requires tracking equipment and a corresponding robot 500(1) or 500(2). Alternatively, behavior data of the provider terminal 400 may be transmitted to the robot 500(1) of the user terminal 100 at a remote location, allowing a task to be processed in real time without the provider directly meeting the user at a remote location. The task may be, for example, an A/S task. During real-time operation at the provider terminal 400, there may be a case in which the robot 500(1) linked to the user terminal 100 is caused to have an event while moving, such as a case that the robot 500(1) gets caught on a random object and does not operate, a resistance value corresponding to the event is generated, and the resistance value needs to be transmitted to the provider terminal 400. In other words, when transmission of behavior data of the provider terminal 400 in one direction to the robot 500(1) of the user terminal 100 is considered to be unidirectional transmission, bidirectional transmission refers to allowing transmission of behavior data not only from the provider terminal 400 to the user terminal 100 but also from the user terminal 100 to the provider terminal 400.

The collaborative mode unit 350 may upload behavior data received from the user terminal 100 and the at least one provider terminal 400 to a collaborative platform. The collaborative mode is a process of combination or aggregation in which a user's behavior data and a provider's behavior data are input to a single robot 500. In this case, since the single robot 500 may not perform two operations (behaviors) at the same time, the single robot 500 may be allowed to operate in the order in which the operations are entered, such as first-in-first-out (FIFO), or perform operations in turns by the user and the provider (In Turn) or perform operations in an order that is determined by each of the user and the provider.

The slave mode unit 360 may apply a behavior simulation program to equipment other than the previously owned robot 500 in the user terminal 100. Considering that "slave" implies the presence of a master, it may refer to allowing a command output from the provider terminal 400 to be directly performed by the robot 500 of the user terminal 100, which is a slave. In other words, it may form a pair like [Master-Slave]. Alternatively, the provider terminal 400 may serve as an input/output interface (I/O Interface) of a console device, such as XBOX or Play Station.

Hereinafter, an operation process according to the configuration of the platform service server shown in FIG. 2 described above will be described in detail with reference to FIGS. 3 and 4. However, it will be apparent that the embodiment is only one of various embodiments of the present invention and is not limiting.

Referring to FIG. 3, the platform service providing server 300 may store behavior data, which is collected from each of the provider terminals 400, as a unit module, as shown in FIG. 3A, or may store a behavior simulation program having a complete flow of operation series, as shown in FIG. 3B. In the case of unidirectional reception from the user terminal 100, as shown in FIG. 3C, the program may be downloaded and executed, similar to Google Play or the App Store, and alternatively, the platform service providing server 300 may use bi-directional transmission of behavior data, as shown in FIG. 3D, or a collaborative method, as shown in FIG. 4A, allowing a single robot 500 to simulate behavior data of multiple users. Alternatively, the platform service providing server 300 may allow the robot 500 to perform the exact same behavior by following a master's command completely, as shown in FIG. 4B, and status data or errors that occur in this process may be set to be automatically uploaded, as shown in FIG. 4C.

Content of the method of providing a behavior simulation platform service omitted from the description referring to FIGS. 2 to 4 may be the same as the method of providing a behavior simulation platform service described with reference to FIG. 1, or may be easily inferred from the content described above, and thus details thereof will be omitted.

Figure 5:
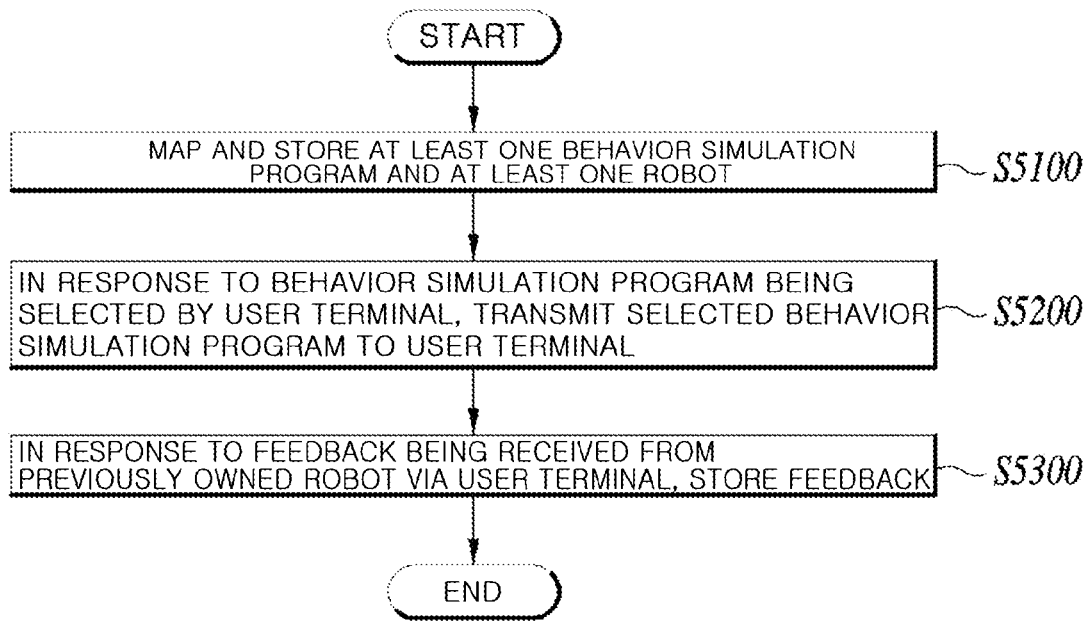
FIG. 5 is a flowchart for describing a method of providing a behavior simulation platform service according to an embodiment of the present invention.

FIG. 5 is a flowchart showing a process of transmitting and receiving data between the components included in the system for providing a behavior simulation platform service shown in FIG. 1 according to an embodiment of the present invention. Hereinafter, an example of a process of transmitting and receiving data between the components will be described with reference to FIG. 5, but the present application is not limited to the embodiment, and it is obvious to those skilled in the art that the process of transmitting and receiving data shown in FIG. 5 may be changed according to the various embodiments described above.

Referring to FIG. 5, the platform service providing server maps and stores at least one behavior simulation program and at least one robot (S5100).

In addition, the platform service providing server, in response to a behavior simulation program being selected by the user terminal, transmits the selected behavior simulation program to the user terminal (S5200).

In addition, the platform service providing server, in response to feedback being received from the previously owned robot via the user terminal, stores the feedback (S5300).

The order of the operations S5100 to S5300 is only an example and is not limiting. That is, the order between the operations S5100 to S5300 may change, and some of the operations may be executed concurrently or deleted.

Content of the method of providing a behavior simulation platform service omitted from the description referring to FIG. 5 may be the same as the method of providing a behavior simulation platform service described with reference to FIGS. 1 to 4, or may be easily inferred from the content described above, and thus details thereof will be omitted.

The method of providing a behavior simulation platform service according to an embodiment described in FIG. 5 may be implemented in the form of a recording medium including instructions executable by a computer, such as an application or program module executable by a computer. Computer-readable media may be any available media that may be accessed by a computer and include both volatile and non-volatile media, and removable and non-removable media. Additionally, computer-readable media may include all types of computer storage media. Computer storage media include both volatile and non-volatile, and removable and non-removable media implemented in any method or technology for storage of information such as computer readable instructions, data structures, program modules or other data.

The method of providing a behavior simulation platform service according to an embodiment of the present invention described above may be executable by an application installed by default on a terminal (which may include programs included in a platform or operating system installed by default on the terminal, etc.) and may also be executed by an application (i.e., a program) installed directly on a master terminal by a user through an application-providing server such as an application store server or a web server associated with an application or service. In this sense, the method of providing a behavior simulation platform service according to an embodiment of the present invention described above may be implemented as an application (i.e., a program) installed by default on the terminal or directly installed by the user, and may be recorded on a readable recording medium to be readable by a computer of a terminal, etc.

It will be apparent to those skilled in the art to which the present invention belongs that the present invention may be embodied in other specific forms without changing the technical sprit or essential features thereof. It should therefore be apparent that the above-described embodiments are illustrative in all aspects and not restrictive. For example, each component described in a singular form may be implemented in a distributed manner, and similarly, components described as being distributed may also be implemented in a combined form.

The scope of the present invention is defined by the appended claims rather than by the foregoing description, and all changes or modifications derived from the meaning and scope of the claims and the equivalents thereof should be interpreted as being included in the scope of the present invention.

The invention claimed is:

1. A system for providing a behavior simulation platform service, the system comprising:
    a user terminal that selects and downloads at least one behavior simulation program and applies the at least one behavior simulation program to a previously owned robot; and
    a platform service providing server including:
    a database unit which maps and stores the at least one behavior simulation program and at least one robot;
    a transmission unit that, in response to a behavior simulation program being selected by the user terminal, transmits the selected behavior simulation program to the user terminal; and
    a storage unit that, in response to feedback being received from the previously owned robot via the user terminal, stores the feedback, and receives and stores behavior data from at least one provider terminal,
    a bidirectional mode unit that transmits behavior data received from the user terminal and at least one provider terminal in two directions, transmits the behavior data received from the provider terminal toward the user terminal and transmits the behavior data received from the user terminal toward the provider terminal,
    a collaborative mode unit that uploads the behavior data received from the user terminal and at least one provider terminal to a collaboration platform and applies the behavior data received from the user terminal and the behavior data received from provider terminal to one robot, and
    a slave mode unit that applies the behavior simulation program to equipment that is not the previously owned robot in the user terminal.

2. The system of claim 1, wherein the previously owned robot is at least one of a wearable robot worn by a user, a robot arm with an arm, a robot with a wheel, a crawler robot, and a robot leg with a leg.

\* \* \* \* \*